Patented Apr. 23, 1940

2,198,172

UNITED STATES PATENT OFFICE 2,198,172

MONOCARBOXYLIC ACID ESTERS

Russell McGill, Arden, Del., assignor to E. I. du Pont de Nemours & Company, Wilmington, Del., a corporation of Delaware No Drawing. Application March 15, 1937, Serial No. 131,109

6 Claims. (Cl. 260—486)

This invention relates to esters and their preparation and more particularly to monocarboxylic acid esters of ketols and their manufacture from alkynylcarbinols.

This invention has as an object the provision of a novel, convenient and economical process for the preparation of monocarboxylic acid esters of ketols. A further object is the utilization of alkynylcarbinols in the preparation of these esters. A further object is the preparation of esters which may be employed as solvents, plasticizers, denaturants, intermediates, etc. Further objects will appear hereinafter.

These objects are accomplished by the following invention wherein a monocarboxylic acid having an ionization constant below 0.0007 and free from acetylenic unsaturation is reacted, in the presence of catalytic amounts of a mercuric salt of a carboxylic acid, with an alkynylcarbinol wherein the alkynyl group is attached by one of its acetylenic carbons, to the carbinol group.

A simultaneous esterification and hydration of the alkylnylcarbinol takes place with formation of an ester of an alpha-ketol, i. e., a carbinol having the characteristic grouping

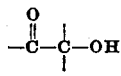

Those of the products not heretofore known have the general formula

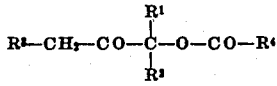

where $R^1$, $R^2$, and $R^3$ are hydrocarbon radicals or hydrogen and $R^4CO$ is the radical of a monocarboxylic acid which is free of acetylenic unsaturation and has at least 4 carbon atoms.

Insofar as I am aware, the chemical literature does not disclose a reaction of the type which I have discovered. In prior additions to acetylenic compounds, the addenda have attached themselves to acetylenic carbon only. In the present process, as will be more apparent from the description which follows, an addendum is also found on a carbon atom alpha to an acetylenic carbon.

The alkynylcarbinols employed in the present invention may be obtained as described in copending applications of Oscar R. Kreimeier, Serial Nos. 91,622 and 91,623, filed July 20, 1936 which have issued January 25, 1938, as United States Patents 2,106,180 and 2,106,181, respectively. The alkynylcarbinols disclosed therein all have the carbinol group attached directly to an acetylenic carbon. While the reason is not definitely known, I have been unable to carry out the process successfully in the case of alkynylcarbinols wherein the carbinol and alkynyl groups are not adjacent.

The mercuric salt used as a catalyst may be that of any carboxylic acid. It is preferable, however, that it be that of the acid being reacted because a slight possible contamination of the product, arising from metathesis of the catalyst, is thereby avoided. Also, when the salt is that of the acid being reacted, it may be prepared when and as needed in situ by adding mercuric oxide to the acid prior to introduction of the carbinol, and heating to reaction temperature.

It is desirable for best results to employ a liquid reaction medium such as an excess of the acid or an inert organic solvent for the reactants such as hydrocarbons, ethers, and chlorinated aliphatic hydrocarbons. In some instances, an excess of the carbinol can be used, though with less satisfactory results. Solvents boiling at the reaction temperature (ordinarily about 120° C.) or higher are most convenient, although lower boiling solvents may be used if the pressure under which the reaction is carried out is increased.

When the acetylenic carbinol is added to the mixture of acid, catalyst and solvent, reaction takes place readily with the evolution of considerable heat. This exothermic reaction may be most conveniently controlled by regulating the rate of addition of the carbinol. After addition of the acetylenic alcohol, the reaction temperature is maintained for a short period by external heating, in order to insure complete reaction. The mixture is cooled and filtered to remove metallic mercury produced by reduction of the catalyst. The unreacted acid may be removed by neutralization. The ketol ester is finally purified by distillation or other conventional means.

The following examples illustrate the more detailed practice of the invention. Parts given are by weight unless otherwise stated. It is to be understood that the invention is not limited to these examples.

EXAMPLE I

*Acetate of 3-methyl-3-hydroxybutanone-2*

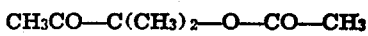

A solution of 20 parts of mercuric acetate and 400 parts of glacial acetic acid was heated to boiling in a vessel fitted with a reflux condenser. Heating was then discontinued and 84 parts of dimethylethynylcarbinol added through the condenser at such a rate that reaction proceeded briskly, boiling being maintained by the heat of reaction. The mixture, which had become dark in color, was boiled for 30 minutes after the addition of the dimethylethynylcarbinol. The solution was cooled, decanted from the precipitated metallic mercury, and poured onto cracked ice. The excess acid was neutralized with cold sodium hydroxide solution. The mixture was steam distilled, the ester layer separated from the distillate, and redistilled. The yield was 95 parts (65% of the calculated), of a material boiling at 170 to 172° C. The refractive index agreed with that of the product obtained by acetylation of a known sample of 3-methyl-3-hydroxybutanone-2. This ketol ester was found to have the following properties:

$$d_4^{25}1.0024 \; ; \; N_D^{25}1.4164$$

$M_R$ (obs.) 36.06; $M_R$ (calc'd) 36.20; saponification number (obs.) 377 and (calc'd) 389.

The neutralization step of the above example may be omitted without substantial change in the result.

Example II

Benzoate of 3-methyl-3-hydroxybutanone-2

$$CH_3—CO—C(CH_3)_2—O—CO—C_6H_5$$

A solution of 10 parts of mercuric acetate and 183 parts of benzoic acid in 260 parts of dry xylene was heated to 125° C. under a reflux condenser. Heating was discontinued and a solution of 10 parts of mercuric acetate in 84 parts of dimethylethynylcarbinol was added through the condenser at such a rate that the reaction proceeded briskly, the reaction temperature being maintained by the heat evolved. The mixture, which had become dark in color, was boiled for 30 minutes after the addition of the dimethylethynylcarbinol. The solution was cooled and decanted from the precipitated metallic mercury onto cracked ice. The excess acid was neutralized with sodium hydroxide. The oil which separated was dried and distilled under reduced pressure. The yield was 25% of the theoretical amount. The 3-methyl-3-hydroxybutanone-2 benzoate boils at 140 to 142° C./10 mm. It has the following properties:

$$d_4^{25}1.0773 \; ; \; N_D^{25}1.5037$$

$M_R$ (obs.) 56.59, $M_R$ (calc'd) 55.68; saponification number (obs.) 280, (calc'd) 272.

Example III

Isobutyrate of 3-methyl-3-hydroxybutanone-2

$$CH_3CO—C(CH_3)_2—O—CO—CH(CH_3)_2$$

A solution of 20 parts of mercuric acetate and 400 parts of isobutyric acid was heated to 125° C. in a vessel fitted with a reflux condenser. One hundred and twenty-six (126) parts of dimethylethynylcarbinol was added through the condenser at such a rate that the reaction proceeded briskly and maintained the temperature between 120 and 130° C. The temperature of the mixture was then held at about 125° C. for 30 minutes by means of external heating. The reaction product was diluted by pouring onto ice and the excess acid neutralized with sodium hydroxide solution. The ester was separated, dried, and distilled, the fraction boiling at 68–69° C./9 mm. being collected. The yield was 62% of the theoretical amount. This compound has the following properties:

$$d_4^{25}0.9511 \; ; \; N_D^{25}1.4160$$

$M_R$ (obs.), 45.38 $M_R$ (calc'd) 45.43; saponification number (obs.) 328, (calc'd) 326.

Example IV 3-methyl-3-hydroxybutanone-2 methyl phthalate

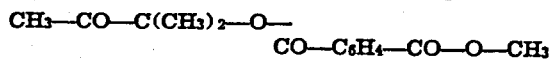
$$CH_3—CO—C(CH_3)_2—O—CO—C_6H_4—CO—O—CH_3$$

One hundred forty-eight (148) parts (one mol) of phthalic anhydride and 32 parts (one mol) of methanol were heated together until they had reacted to form monomethyl phthalate. Two hundred and sixty (260) parts of xylene and 10 parts of mercuric acetate were added and the mixture heated to 125° C. One hundred twenty-six parts dimethylethynylcarbinol containing 10 parts of mercuric acetate in solution was added through the condenser at such a rate as to cause the reaction to take place vigorously. The reaction temperature (120–130° C.) was maintained for an additional 30 minutes after which the mixture was poured into water and neutralized. The oil was separated, distilled under reduced pressure, and the fraction boiling between 190–192° C./11 mm. was collected. The yield was 38% of the calculated amount. The product had the following properties:

$$d_4^{25}1.1627 \; ; \; N_D^{25}1.5075$$

$M_R$ (obs.) 67.63, $M_R$ (calc'd) 66.17; saponification number (obs.) 434 (calc'd) 425.

Example V

Methacrylate of 3-methyl-3-hydroxybutanone-2

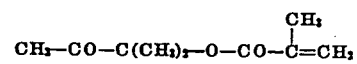
$$CH_3—CO—C(CH_3)_2—O—CO—\underset{CH_3}{C}=CH_2$$

A solution of 20 parts of mercuric acetate, 5 parts of hydroquinone and 400 parts of methacrylic acid was heated to 125° C. in a vessel fitted with a reflux condenser. One hundred twenty-six (126) parts of dimethylethynylcarbinol was added through the condenser at such a rate that the reaction proceeded briskly, maintaining the temperature between 120 and 130° C. After all the dimethylethynylcarbinol had been added, which required about 40 minutes, the mixture was cooled, diluted with water, the excess acid neutralized and the ester steam-distilled. The oily ester was separated from the water, dried and fractionally distilled, the fraction boiling at 71–73° C./9 mm. being collected. The yield was 65% of the calculated amount. The product had the following properties:

$$d_4^{25}0.9861 \; ; \; N_D^{25}1.4369$$

$M_R$ (obs.), 45.15 $M_R$ (calc'd) 44.96; saponification number (obs.) 330, (calc'd) 329.

Example VI

Acetate of 3-methyl-3-hydroxypentanone-2

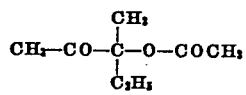
$$CH_3—CO—\underset{C_2H_5}{\overset{CH_3}{C}}—O—COCH_3$$

A solution of 20 parts of mercuric acetate in 400 parts of glacial acetic acid was heated to boiling in a reaction vessel fitted with a reflux condenser. Heating was discontinued, and 98 parts of methylethylethynylcarbinol was added through the condenser over a period of about one hour at such a rate that the reaction proceeded briskly, boiling being maintained by the heat of reaction. The solution was cooled, decanted from the precipitate of metallic mercury onto cracked ice, and the excess acid neutralized with sodium hydroxide. The mixture was steam distilled, and the ester layer was separated from the distillate and redistilled. The fraction boiling at 66–68° C./12 mm. pressure was collected. The yield was 74% of the calculated amount. The product had the following properties:

$$d_4^{20} 0.9929 ; N_D^{25} 1.4240$$

$M_R$ (obs.) 40.60, (calc'd) 40.81; saponification number (obs.) 346, (calc'd) 355.

The propionate of 3-methyl-3-hydroxypentanone-2 can be made in good yield in exactly the same way.

EXAMPLE VII

*Acetate of 3-hydroxypentanone-2*

A solution of 10 parts of mercuric acetate in 400 parts of acetic acid was heated to boiling in a reaction vessel fitted with a reflux condenser. The source of heat was removed and 84 parts of ethylethynylcarbinol added through the condenser at such a rate that the reaction proceeded briskly, boiling being maintained by the heat of reaction. The mixture was boiled for 30 minutes after the addition of the ethylethynylcarbinol. The solution was cooled, decanted from the precipitated metallic mercury onto cracked ice, and the excess acid neutralized with sodium hydroxide. The mixture was steam distilled and the ester separated from the distillate and redistilled, the fraction boiling at 68 to 70° C. at 13 mm. pressure being collected. The product had the following properties:

$$d_4^{20} 0.9945 ; N_D^{25} 1.4160$$

$M_R$ (obs.) 36.34, (calc'd) 36.20.

The reaction of simultaneous hydration and esterification of alkynylcarbinols takes place most satisfactorily at temperatures of about 120° C. The process is operable from 0° to 160° but a temperature range of 110–135° C. is preferred. In repeating the procedure of Example I but at 10° C., reaction was obtained and the same product obtained but in lower yield than that obtained by the process of Example I.

In addition to the solvents mentioned in the examples, the following may be used: toluene, benzene, cymene, dioxane, dibutyl ether, anisol, acetylene tetrachloride, and the like.

Any monocarboxylic acid having an ionization constant of less than 0.0007 may be used in this process. For best results the acid should be substantially anhydrous. Among the monocarboxylic acids coming within the above class and thus operable in the process of the present invention are the following: acetic, propionic, butyric, valeric, capric, caproic, benzoic, naphthoic, phenylacetic, cinnamic, acrylic, crotonic, and methacrylic. The ionization constants of some of these acids are shown below in comparison with yield of product.

| Acid | Ionization constant | Yield |
|---|---|---|
| | | Percent |
| Isobutyric | 0.000014 | 62 |
| Benzoic | 0.00006 | 25 |
| Acetic | 0.000018 | 65 |
| Monomethyl phthalate | 0.000655 | 66 |
| Propionic | 0.000013 | 57 |
| Methacrylic | | 65 |

The unsaturated acids containing a triple bond are not suited to this reaction since the triple bond tends to cause the acid to undergo side reactions catalyzed by the mercury catalyst.

The term monocarboxylic acids includes partial esters of polycarboxylic acids where the ester contains one and only one free carboxyl group.

Any alkynyl carbinol wherein the carbinol is attached to one of the triply bonded carbons may be used including propargyl alcohol, methylpropargyl alcohol, ethylpropargyl alcohol, hexylpropargyl alcohol, methylethynylcarbinol, ethylethynylcarbinol, ethylbutynylcarbinol, isopropylethynylcarbinol, hexylethynylcarbinol, butylamylethynylcarbinol, vinylethynylcarbinol, chloromethylethynylcarbinol, dimethylpropynylcarbinol, dimethylethynylcarbinol, methylethynylcarbinol, methylpropylbutynylcarbinol, methylpropylethynylcarbinol, diethylethynylcarbinol, methylisobutylethynylcarbinol, methylamylethynylcarbinol, diisopropylethynylcarbinol, ethynylcyclohexanol, methylphenylethynylcarbinol, isopropylphenylethynylcarbinol, etc. as well as other alkynylcarbinols disclosed in or capable of preparation by the processes of copending Kreimeier applications Serial Numbers 91,622 and 91,623, filed July 20, 1936.

In the examples 0.03–0.06 mol of mercuric salt catalyst per mol of alkynylcarbinol was used. The amount of catalyst may be varied outside these limits. Larger quantities may be necessary where the carbinol reduces the catalyst rapidly. In this case the reduction of the catalyst may be partially prevented and the amount needed be reduced by adding it in small portions during the course of the reaction. In cases where the catalyst is not reduced smaller quantities may be used.

The ketol esters described herein may be used as solvents or softeners for cellulose derivatives, e. g., nitrocellulose, cellulose acetate, ethyl cellulose, and benzyl cellulose; ingredients of pesticides; resin intermediates; and alcohol denaturants.

The greatest advantage of the process of the present invention over the processes of the prior art resides in the fact that ketol esters can be made in one step directly from acetylenic alcohols. The prior art processes include esterification as a separate and final step. In the case of keto-tertiary-alcohols, this is often very difficult, if not impossible. In the present invention, tertiary-ethynylcarbinols have been found, contrary to what would have been predicted, to react more readily than the primary and secondary ethynyl-carbinols.

The process further differs from the prior art in that the acetylenic compound is caused to react with an acid to yield a product (water) which then adds to the triple bond, while the original reagent (acid) is eventually found attached to a carbon atom which was not part of the acetylenic group. In all known reactions where mercury catalyzes an addition, the addenda are eventually found on a carbon atom which was part of the acetylenic group. This is true of the preparation of vinyl acetate, ethylidene diacetate, ketals (acetals from acetylene) and ketones from acetylenes.

The above description and examples are intended to be illustrative only. Any modification of or variation therefrom which conforms to the spirit of the invention is intended to be included within the scope of the claims.

I claim:

1. Process which comprises reacting an alkynylcarbinol of the formula $$R^2C{\equiv}C-\underset{R^3}{\overset{R^1}{C}}-OH$$

wherein $R^1$, $R^2$, and $R^3$ are members of the class consisting of hydrogen and hydrocarbon radicals, with a monocarboxylic acid free of acetylenic unsaturation and having an ionization constant below 0.0007.

2. Process which comprises reacting an alkynylcarbinol of the formula $$R^2C{\equiv}C-\underset{R^3}{\overset{R^1}{C}}-OH$$

wherein $R^1$, $R^2$, and $R^3$ are members of the class consisting of hydrogen and hydrocarbon radicals, with a monocarboxylic acid free of acetylenic unsaturation and having an ionization constant below 0.0007, said reaction being carried out in the presence of a mercuric salt of a carboxylic acid.

3. Process which comprises reacting an alkynylcarbinol of the formula $$R^2C{\equiv}C-\underset{R^3}{\overset{R^1}{C}}-OH$$

wherein $R^1$, $R^2$, and $R^3$ are members of the class consisting of hydrogen and hydrocarbon radicals, with a monocarboxylic acid free of acetylenic unsaturation and having an ionization constant below 0.0007, said reaction being carried out in the presence of a mercuric salt of a carboxylic acid and in the presence of an inert organic solvent for the reactants.

4. Process which comprises heating under reflux an alkynylcarbinol of the formula $$R^2C{\equiv}C-\underset{R^3}{\overset{R^1}{C}}-OH$$

wherein $R^1$, $R^2$, and $R^3$ are members of the class consisting of hydrogen and hydrocarbon radicals, with a saturated aliphatic monocarboxylic acid having an ionization constant below 0.0007 in the presence of a mercuric salt of a carboxylic acid and in the presence of an inert organic solvent.

5. Alpha-ketol esters of methacrylic acid having the formula $$R^2-CH_2-CO-\underset{R^3}{\overset{R^1}{C}}-O-CO-\overset{CH_3}{\underset{}{C}}{=}CH_2$$

wherein $R^1$, $R^2$ and $R^3$ are members of the class consisting of hydrogen and hydrocarbon radicals.

6. The methacrylate of 3-methyl-3-hydroxybutanone-2.

RUSSELL McGILL.

Certificate of Correction

Patent No. 2,198,172. April 23, 1940.

RUSSELL McGILL

It is hereby certified that error appears in the printed specification of the above numbered patent requiring correction as follows: Page 2, second column, line 28, for "$d_4^5 1.1627; N_D^{25} 1.5075$" read $d_4^{25} 1.1627; N_D^{25} 1.5075$; and that the said Letters Patent should be read with this correction therein that the same may conform to the record of the case in the Patent Office.

Signed and sealed this 9th day of July, A. D. 1940.

[SEAL]

HENRY VAN ARSDALE,
*Acting Commissioner of Patents.*